(134.)

2 Sheets--Sheet 1.

WARREN GLOVER.

Improvement in Treadle Attachment for Sewing Machines.

No. 4,669.

Reissued Dec. 12, 1871.

AM. PHOTO-LITHOGRAPHIC CO. N.Y. (OSBORNE'S PROCESS.)

(134.)

2 Sheets--Sheet 2.

WARREN GLOVER.

Improvement in Treadle Attachment for Sewing Machines.

No. 4,669.

Reissued Dec. 12, 1871.

Witnesses:
Fred'k Ast'ó
J. C. Evans

Inventor:
Warren Glover
by his attys. A. H. & R. K. Evans.

AM. PHOTO-LITHOGRAPHIC CO. N.Y. (OSBORNE'S PROCESS.)

UNITED STATES PATENT OFFICE.

WARREN GLOVER, OF MILLBURY, MASSACHUSETTS, ASSIGNOR TO AI B. SHAW.

IMPROVEMENT IN TREADLE ATTACHMENTS FOR SEWING-MACHINES.

Specification forming part of Letters Patent No. 232, dated January 29, 1861; reissue No. 4,669, dated December 12, 1871.

*To all whom it may concern:*

Be it known that I, WARREN GLOVER, of Millbury, in the county of Worcester and State of Massachusetts, have invented a new and Improved Treadle Attachment for Sewing-Machines, Turning-Lathes, and other machines which are operated by treadles; and I do hereby declare that the following is a full, clear, and exact description of the same, reference being had to the accompanying drawing making a part of this specification, in which—

Figure 1:
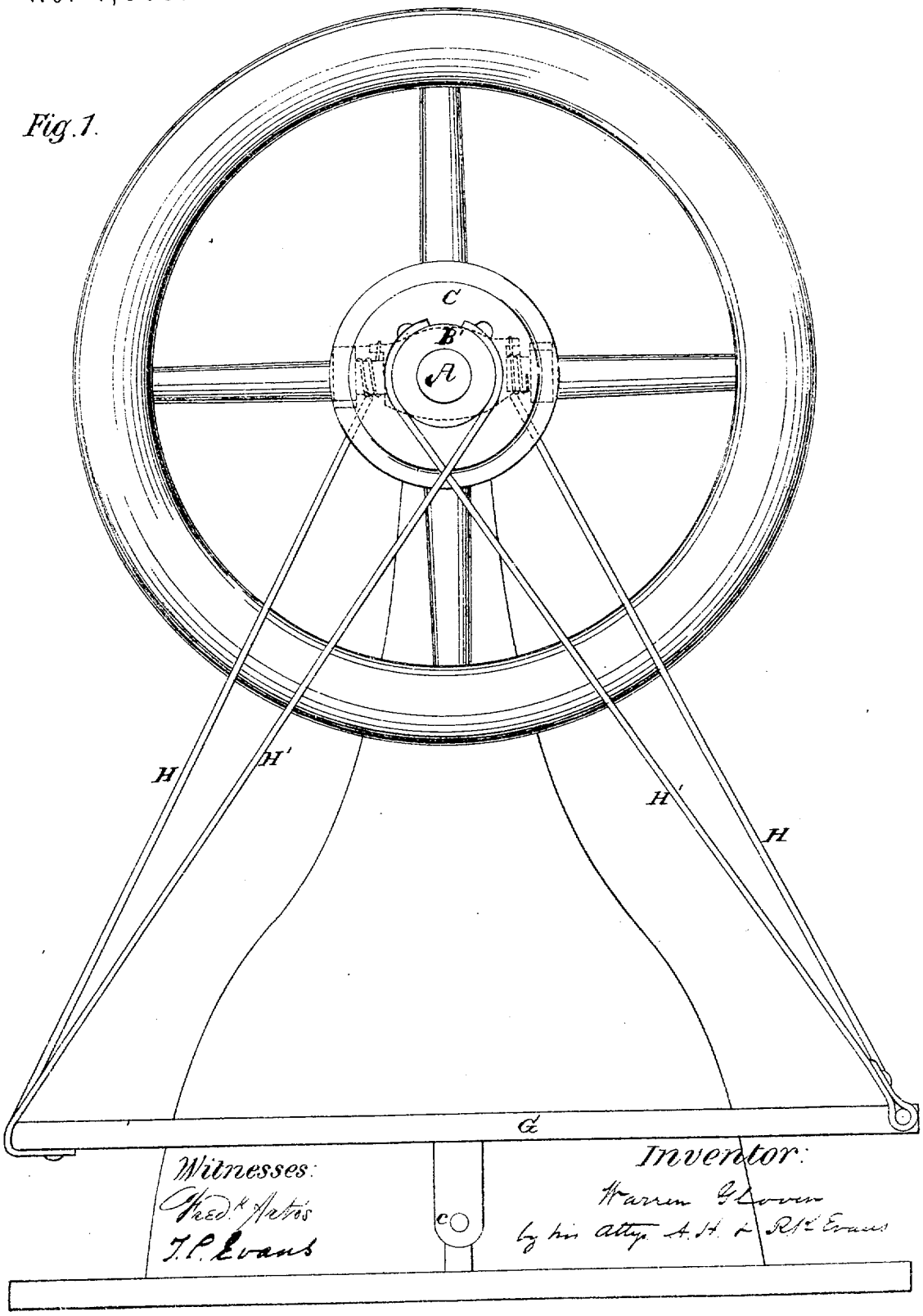
Figure 2:
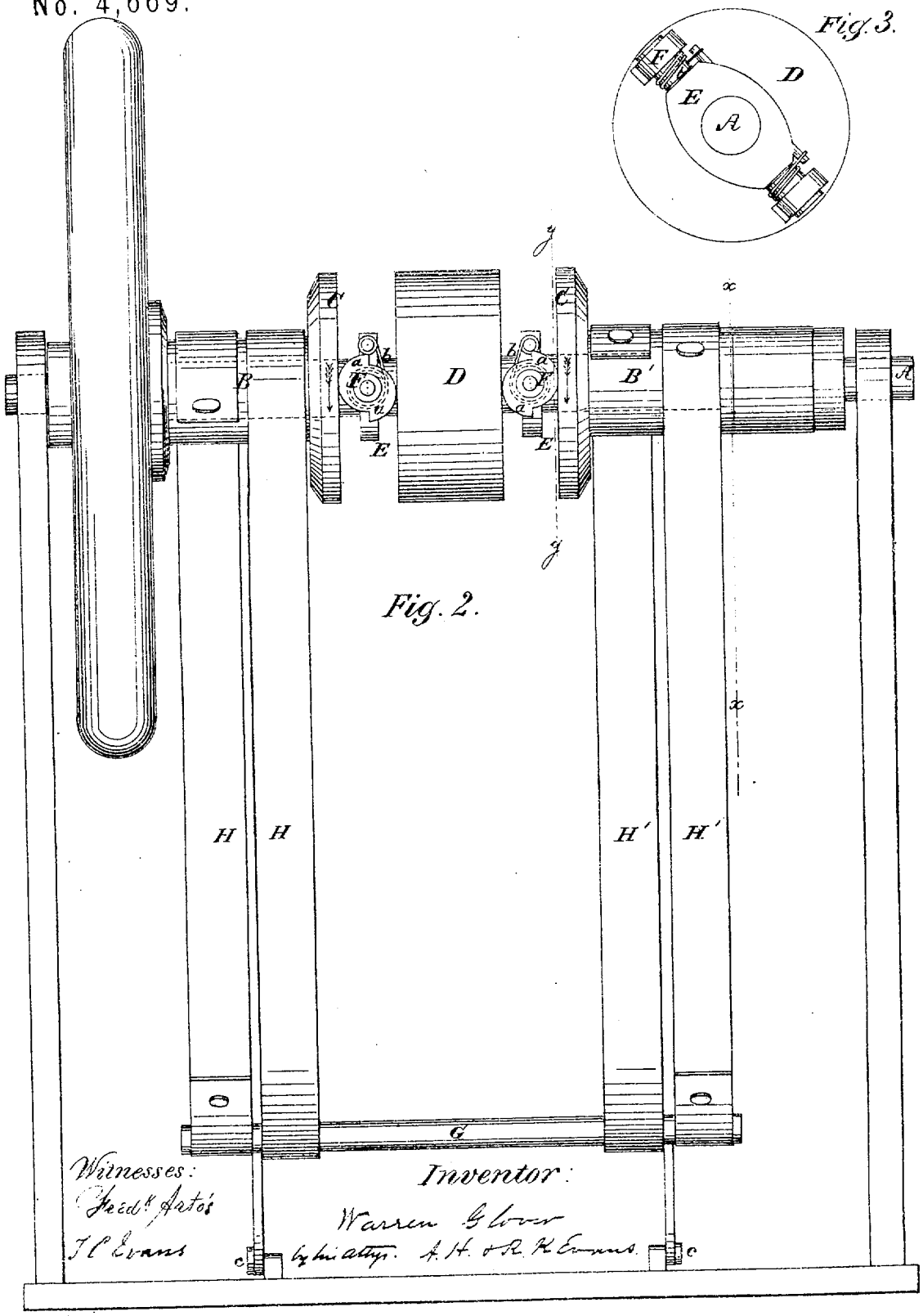

Figure 1 is a side sectional view of my invention taken on the line *x x*, Fig. 2. Fig. 2 is a front view of my invention. Fig. 3 is a transverse section on the line *y y*, Fig. 2.

Similar letters of reference indicate corresponding parts in the several figures.

The object of this invention is to communicate motion from a treadle to the driving-shaft of a machine in such a manner that the shaft cannot casually be turned in the wrong direction, and the shaft at the same time rendered capable of being turned immediately under the tread of the foot in any position of the treadle, thereby obviating the difficulty attending the use of the ordinary crank, which cannot be turned from the treadle in the proper direction at once from all points in the path of its rotation. The invention also has for its object the obviating of the concussion attending the movement of reciprocating parts, such as frames, rods, &c., which have hitherto formed an essential element in devices for converting a vibrating or a reciprocating motion into a rotary one, or vice versa. The length of the stroke may, at the will of the operator, be longer or shorter than that of the crank. I am also enabled to run at a greater speed than by the use of the crank.

To enable those skilled in the art to fully understand and construct my invention, I will proceed to describe it.

A represents a driving-shaft of a machine on which two collars, B B′, are placed loosely and allowed to rotate freely. Each collar B B′, at its inner end, has a circular disk or flanch, C, attached or formed on it. The faces of the disks or flanches are in parallel planes, and between the disks or flanches C C there is a hub or pulley, D, which is permanently secured to the shaft A. On the shaft A there are placed loosely two arms, E E, an arm being in each space between a disk, C, and the hub D. At the ends of the arms E there are placed eccentrics F, one on each end of each arm. These eccentrics are each of a double form—that is to say, they are formed of two prominences, *a a*, as shown clearly in Fig. 2, and the two eccentrics of each arm are placed in reverse positions, and those of one arm have also a position reverse to those of the other. (See Figs. 2 and 3.) The eccentrics F of each arm have spiral springs *b* attached to them, and these springs have a tendency to keep the prominences *a a* of the eccentrics F against or in contact with the faces of the disks C and the sides of the hub D. G is a treadle, which is fitted and works on centers *c c*; and H H H′ H′ are straps, which are attached to the treadle at its ends, two at each side, and to the collars B B′. The straps H H are attached to the collar B, and they wind around it in opposite directions. The straps H′ H′ are attached to the collar B′, and also wind around it in opposite directions. The straps H H, however, are attached to their collar B in a manner reverse to that of the straps H′ H′ to their collar B′.

By this arrangement it will be seen that as the treadle G is vibrated the collars B B′ will be turned in reverse directions, and each rotated first in one direction and then in the other. The eccentrics F are acted upon by the disks C and bind between said disks and the sides of the hub D, and thereby cause the shaft A to rotate. The eccentrics F, however, will not bind between said disks C and the hub D except when the disks are rotating in the direction indicated by the arrows, such result being due to the position of the eccentrics F on the arms E. The disks C, therefore, alternately rotate the shaft A and communicate to it a continuous rotary motion as the treadle G is vibrated.

It will be seen that the shaft A may be turned in the proper direction at once as the treadle is vibrated—in fact, it cannot be turned in the wrong direction; and the device will, therefore, prove valuable for sewing-machines, as the turning of the driving-shaft of these machines in the wrong direction is attended with the breaking of needles and a derangement of the working parts.

Having thus described my invention, what I desire to secure by Letters Patent, and claim to be new, is—

1. A clutch applied to driving-shafts of sewing and other machines, and connected with the treadle by the means shown or any equivalents thereof, for the purposes described.

2. Connecting a clutch with the treadle by the means shown or any equivalents thereof, for the purposes set forth.

Witness my hand this 14th day of November, A. D. 1871.

WARREN GLOVER.

Witnesses:
B. B. HOWARD,
JOHN HOPKINS.

(134)